(12) United States Patent
Garter et al.

(10) Patent No.: US 7,803,418 B2
(45) Date of Patent: Sep. 28, 2010

(54) NUT BUTTER COMPOSITIONS AND METHODS RELATED THERETO

(75) Inventors: Barbara L. Garter, Portage, MI (US); Michael W. Powers, Battle Creek, MI (US); Thomas Z. Treece, Altamonte Springs, FL (US)

(73) Assignee: Kellogg Company, Battle Creek, MI (US)

( * ) Notice: Subject to any disclaimer, the term of this patent is extended or adjusted under 35 U.S.C. 154(b) by 279 days.

(21) Appl. No.: 11/863,948

(22) Filed: Sep. 28, 2007

(65) Prior Publication Data

US 2008/0081092 A1 Apr. 3, 2008

Related U.S. Application Data

(60) Provisional application No. 60/848,569, filed on Sep. 29, 2006.

(51) Int. Cl.
*A23L 1/38* (2006.01)

(52) U.S. Cl. .................. 426/633; 426/634; 426/654; 426/661; 426/601

(58) Field of Classification Search .................. None
See application file for complete search history.

(56) References Cited

U.S. PATENT DOCUMENTS

| | | | |
|---|---|---|---|
| 2,948,621 A | 8/1960 | Avera | |
| 2,955,040 A | 10/1960 | Avera | |
| 3,245,803 A | 4/1966 | Baker | |
| 3,615,591 A | 10/1971 | Newlin | |
| 3,903,311 A | 9/1975 | Billerbeck et al. | |
| 4,477,482 A | 10/1984 | Avera | |
| 4,661,360 A | 4/1987 | Smith | |
| 4,832,977 A | 5/1989 | Avera | |
| 4,839,193 A | 6/1989 | Mange et al. | |
| 4,942,055 A | 7/1990 | Avera | |
| 5,079,027 A * | 1/1992 | Wong et al. | 426/633 |
| 5,366,754 A | 11/1994 | Rudan et al. | |
| H1395 H * | 1/1995 | Prosser | 426/633 |
| 5,536,524 A | 7/1996 | Miller | |
| 5,603,979 A | 2/1997 | Lasdon et al. | |
| 5,876,781 A | 3/1999 | Lasdon et al. | |
| 5,962,064 A | 10/1999 | Perlman | |
| 5,968,583 A | 10/1999 | Gautchier et al. | |
| 6,153,249 A * | 11/2000 | Gamay et al. | 426/633 |
| 6,592,915 B1 | 7/2003 | Froseth et al. | |
| 6,863,911 B2 | 3/2005 | Zimeri et al. | |
| 7,060,311 B1 * | 6/2006 | Milani et al. | 426/414 |
| 7,264,835 B2 * | 9/2007 | Funk | 426/89 |
| 2002/0051837 A1 | 5/2002 | Beharry | |
| 2004/0126477 A1 | 7/2004 | Coleman et al. | |

(Continued)

*Primary Examiner*—Helen F Pratt
(74) *Attorney, Agent, or Firm*—Dickinson Wright PLLC

(57) ABSTRACT

In general terms, this invention provides nut butter compositions and methods for preparing the disclosed nut butter compositions. In preferred embodiments, the nut butter composition or method is a peanut butter. In another preferred embodiment, the present invention provides a method of preparing a gelled peanut butter composition comprising the steps of: blending peanut butter, emulsifier, sugar alcohol and triglyceride-based stabilizer so as to create a first blend; blending starch with the first blend to create a second blend; resting the second blend until a gel is formed, wherein the peanut butter is not more than 85° F. and 65-85%, the emulsifier is 0.15-0.5%, the sugar alcohol is 5-30%, the triglyceride-based stabilizer is 1-5%, and the starch is 1-5%.

19 Claims, 1 Drawing Sheet

U.S. PATENT DOCUMENTS

2004/0202764 A1 10/2004 Jindra et al.
2004/0265472 A1 12/2004 Corfman et al.
2005/0095321 A1 5/2005 Heywood et al.
2005/0136165 A1 6/2005 Cirigliano et al.

* cited by examiner

NUT BUTTER COMPOSITIONS AND METHODS RELATED THERETO

CROSS REFERENCE TO RELATED APPLICATIONS

The present application claims priority to U.S. Provisional Patent Application 60/848,569, filed on Sep. 29, 2006.

FIELD OF THE INVENTION

This invention relates generally to modified nut butters and more particularly to nut butters that resist oil migration to a chocolate piece, topping or filling, when the nut butter and the chocolate are in contact.

BACKGROUND OF THE INVENTION

Consumers have long enjoyed the combination flavor of nuts with chocolate, particularly the creamy texture and flavor of nut butters and chocolate. Processed products, such as chocolate-covered, peanut butter granola bars, or peanut butter and chocolate candies, do not contain high levels of peanut butter because the oil from the peanut butter migrates through the chocolate, or "oils out." "Oiling out" creates an undesirable food profile, and, as a result, simulated nut butter/chocolate foods have been developed in the past.

U.S. Pat. Nos. 2,948,621 and 2,955,040 disclose processes of manufacturing nut-flavored additives, particularly peanut butter, wherein the nut butter is stabilized by mixing it with an aqueous solution of a polyhydric alcohol. U.S. Pat. No. 3,245,803 discloses a peanut butter stabilizer comprising polyhydric alcohol as a vehicle and solid beta-prime crystalline glycerides with optional addition of emulsifiers, hydrocolloids and salt. One of the polyhydric alcohols recited is sorbitol. U.S. Pat. No. 6,153,249 discloses a cold-formed low-fat peanut butter product comprising defatted peanut flour, water, a sugar alcohol that can include sorbitol and a final water activity level of 0.8 or less. The present invention is neither disclosed nor suggested by any of the previous references, either alone or in combination.

SUMMARY OF THE INVENTION

The inventive nut butter compositions provide surprising results by providing superior "oiling out" resistance. Moreover, the compositions also provide flexibility in the amount of natural nut butters in any chocolate-containing formulation; this flexibility provides superior nutritional benefits, superior flavor profile, and superior product definition range.

In general terms, this invention provides nut butter compositions and methods for preparing the disclosed nut butter compositions. In preferred embodiments, the nut butter composition or method utilizes a peanut butter.

In a more preferred embodiment, the present composition provides a gelled peanut butter composition comprising 65-85% peanut butter, 0.15-0.5% emulsifier, 5-30% sugar alcohol, 1-5% triglyceride-based stabilizer, and 1-5% starch.

In another preferred embodiment, the present invention provides a method of preparing a gelled peanut butter composition comprising the steps of: blending peanut butter, emulsifier, sugar alcohol and triglyceride-based stabilizer so as to create a first blend; blending starch with the first blend to create a second blend; resting the second blend until a gel is formed, wherein the peanut butter is not more than 85° F. and 65-85%, the emulsifier is 0.15-0.5%, the sugar alcohol is 5-30%, the triglyceride-based stabilizer is 1-5%, and the starch is 1-5%.

All references to ingredient percentages are to the weight percentage as part of the finished product. These and other features and advantages of this invention will become more apparent to those skilled in the art from the detailed description of a preferred embodiment. The drawings that accompany the detailed description are described below.

DETAILED DESCRIPTION

Figure 1:
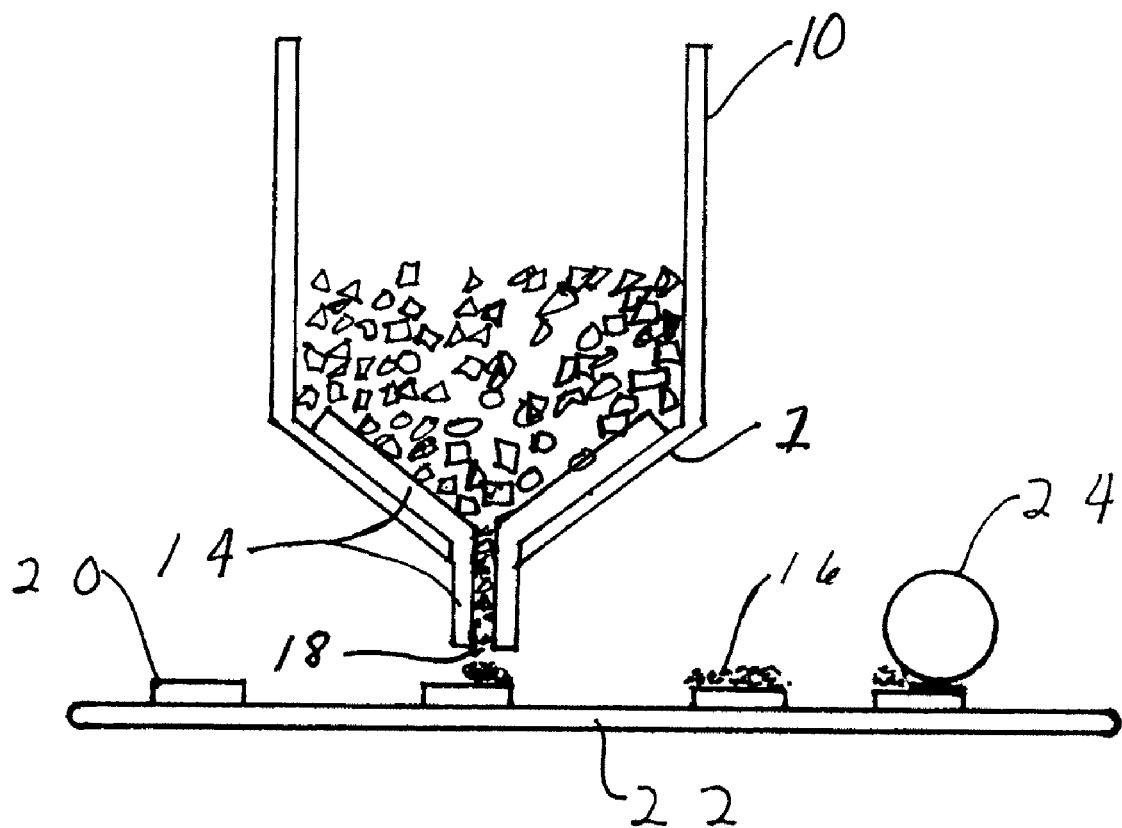
FIG. 1 is a schematic diagram of an embodiment of the present invention.

The present invention provides nut butter compositions useful to resist migration of nut butter-inherent oils into a chocolate piece, topping or filling. The invention is particularly useful on the exterior (as a topping) and/or interior (as a filling) of a chocolate-enrobed food product. For instance, the present invention greatly improves the following foods: RTE cereals; snack, meal or other food bars; cookies; crackers; and toaster pastries.

Nut butters useful in the present invention include those butters made from tree nuts or ground nuts (legumes) or seeds, including almonds, cashews, hazelnuts, pecans, macadamia nuts, walnuts, peanuts, sunflower seeds, soy seeds, and sesame seeds. The nut butter component may comprise mashed, macerated, ground or otherwise crushed nuts alone, or in combination with other common nut butter ingredients, such as sweeteners and stabilizers. The nut butter component may comprise a nut butter from a single nut type, or a nut butter from several nut types. A particularly preferred nut butter for use in the present invention is peanut butter, more preferably a natural nut butter. The invention preferably comprises from 65-85% nut butter, more preferably 70-80% most preferably approximately 75%.

Emulsifiers useful in the present invention are any known in the art, and include lecithin, mono- and diglycerides, propylene glycol monoesters, lactylated esters, polyglycerol esters, sorbitan esters, ethoxylated esters, succinylated esters, fruit acid esters, acetylated monoglycerides, phosphated esters, or sucrose esters. The emulsifier component may comprise a single emulsifier or a combination of emulsifiers. A particularly preferred emulsifier is lecithin. The present invention preferably utilizes 0.15-0.5% emulsifier, more preferably 0.15-0.4%, most preferably approximately 0.2%.

Sugar alcohols useful in the present invention are any known in the art, and include sorbitol, erythritol, glycerol, hydrogenated starch hydrolysates, lactitol, maltitol, mannitol, or xylitol. The sugar alcohol component may comprise a single sugar alcohol or a combination of sugar alcohols. A particularly preferred sugar alcohol is sorbitol. More preferably, the sorbitol is prepared as a 70% solution in water prior to use in the present invention. The invention preferably utilizes 5-30% sugar alcohol, more preferably 5-25%, most preferably 12-20%.

Stabilizers useful in the present invention are any known in the art which are triglyceride based, including normally solid, in the beta prime crystalline phase, triglyceride stabilizers. Such stabilizers include substantially completely hydrogenated rapeseed oil, cottonseed oil, palm oil and tallow. The stabilizer component may comprise a single triglyceride-based stabilizer or a combination of triglyceride-based stabilizers. A particularly preferred triglyceride-based stabilizer for use in the present invention is "Stabilizer PS 105" available from Danisco, in Copenhagen, Denmark. The invention preferably comprises 1-5% triglyceride-based stabilizer, more preferably 2-5%, most preferably 4-5%.

Food starches useful in the present invention are any starches known in the art, and include polymers of glucose from a fruit, seed, rhizome, or tuber. Starches useful may be obtained from arrowroot, tapioca, rice, wheat, corn, potatoes, arracha, buckwheat, banana, barley, sassava, kudzu, oca, sago, sorghum, sweet potato, taro, yam, fava bean, lentil, and pea. The starch component may comprise a single starch or a combination of starches. Preferred are dextrins (low molecular weight food starches). Particularly preferred are those dextrins that are tapioca-based. A preferred dextrin is "N-Zorbit" available from National Starch, in Berkeley, Calif. The composition also preferably includes from 1-5% starch, more preferably 2-5%, most preferably 4-5%.

Optional ingredients useful in the nut butter compositions of the present invention include salt, flavorings, inclusions, and nutritive enhancers. Salt is preferably present at approximately 1%. Nutritive enhancers may be selected from the group consisting of: soluble fiber; insoluble fiber; fructo-oligosaccharides; insulins; psyllium husk fiber; citrus fiber; oat fiber; microground fiber; vegetable gums; dextrins; resistant starches; grain brans; oat brans; wheat brans; corn brans; cactus extracts; beta carotene; quinoa; whey protein extracts; omega fatty acids; spirulinas; brown seaweeds; probiotics; prebiotics; ginko bilboa; flax seed; flax seed oil; saw palmetto; grape seed extract; milk thistle; bilberry; green tea; *Echinacea;* cohosh; cayenne; saponins; antioxidants; ginsing; wild yam extract; yohimbe; noni; algae; fruit vinegar; fruit concentrate; mangosteen; acai; goji; pomegranate; wheat grass; chlorella; sterols; alfalfa; barley grass; phytonutrients; beet fiber; oat fiber; apple pectin; black current fiber; flavones; isoflavones; soy; evening primrose oil; essential fatty acids; eicosapentanoid acid; docosahaenoic acid; bee pollen; royal jelly; creatine; caffeine; zinc; vitamins; minerals; aloe; *Hoodia;* conjugated linoleic acid; *Caralluma fibriata;* and olive oil.

Chocolates useful in the present invention include any known in the art, including white chocolate, milk chocolate, and dark chocolate. Chocolate is an optional ingredient, and may be present in a food item herein in the form of pieces, toppings or fillings. The chocolate component may optionally be sweetened, stabilized, flavored, and optionally comprises inclusions or nutritive enhancers. The chocolate component may comprise one chocolate type, or be a combination of chocolate types, and also may be a "compound coating" as that term is known in the art. When the chocolate component is used as a layer, the thickness of the chocolate can be very thin due to the resistance of oil transfer from the nut butter to the chocolate. Preferably, in such an embodiment, the chocolate layer can be less than 2 mm thick, more preferably less than 1 mm thick and most preferably less than 0.5 mm thick. Moreover, pieces of chocolate may be thin and/or small, as can any filling.

The invention also provides a method for preparing the inventive nut butter compositions described. In a preferred embodiment, the present invention provides a method of preparing a gelled nut butter composition comprising the steps of: blending nut butter, emulsifier, sugar alcohol and triglyceride-based stabilizer so as to create a first blend; blending starch with the first blend to create a second blend; resting the second blend until a gel is formed, wherein the nut butter is not more than 85° F. and 65-85%, the emulsifier is 0.15-0.5%, the sugar alcohol is 5-30%, the triglyceride-based stabilizer is 1-5%, and the starch is 1-5%. Preferred are those methods wherein the nut butter is approximately 60 to approximately 85° F., more preferred are those wherein the nut butter is approximately 75 to approximately 85° F., most preferred are those wherein the temperature never exceeds 85° F. throughout the entire process. In a preferred embodiment, resting of the second blend is accomplished by storing the mixture at 60 to 80° F. for 20 to 30 hours, more preferably at 65 to 75° F. for 22 to 28 hours, most preferably approximately 70° F. for approximately 24 hours.

Optionally, the resulting gel can be cut into pieces using mechanical means. Cutting the gel into pieces is advantageous in that the broken pieces may be applied to a food surface efficiently, with very little waste. After applying the cut pieces, the surface of the food product can be smoothed using any means desirable. In an industrial setting, the gel may be broken into pieces utilizing a "Comil" milling apparatus (manufactured by Quadro), preferably broken into pieces less than ¾ of an inch in any dimension. The cut gel pieces may be passed through a standard streusel topping machine to deposit them onto pre-formed food products, such as RTE cereal, bars, cookies, crackers, toaster pastries, or other suitable food products. The pieces are mechanically spread over the food product via a roller or series of rollers, and subsequently enrobed in chocolate.

For these reasons, the present invention also includes food products having nut butter compositions in contact with a chocolate coating, particularly an unusually thin coating, drizzle or topping of chocolate, because no oiling out will occur even after greater than 6 months of storage. Particularly preferred are those with a chocolate coating on a bar-shaped food. More preferred are those which comprise a granola bar; a nut butter composition comprising 65-85% nut butter, 0.15-0.5% emulsifier, 5-30% sugar alcohol, 1-5% triglyceride-base stabilizer, and 1-5% starch; and a chocolate coating; wherein the nut butter composition is a first coating on the granola bar, and the chocolate coating is a second coating on the first coating. Most preferred are those wherein the nut butter is peanut butter, the emulsifier is lecithin, the sugar alcohol is sorbitol, the triglyceride-based stabilizer is "Stabilizer PS 105" from Danisco, and the starch is tapioca starch.

FIG. 1 shows an apparatus useful to top food items with the present compositions. As a first step, not shown, the composition is broken up into manageable sized pieces of preferably about ¾ of an inch on a side. This can be accomplished in any of a number of ways known in the art, a preferred method is to process the composition through a size-reducing set of screens such as a "Comil" milling apparatus. The broken pieces are then fed into a streusel feeder shown in cross-sectional side view at 10 in FIG. 1. The feeder 10 includes sidewalls 12 having movable screens 14 mounted thereon. The broken pieces of the topping 16 are further reduced in size by the movement of the screens 14 and they crumble out of an opening 18 and onto a food product 20. The food product 20 is located on a moving conveyor belt 22 that passes the food product 20 past the opening 18. The food product 20 with topping 16 then passes under a compression roller 24 that compresses and spread the topping 16 evenly over the food product 20. The food product 20 with compressed topping 16 is then layer or enrobed in chocolate in a manner know in the art. Enrobing can be accomplished in a number of ways, by use of a waterfall or by passing it through a bath, not shown.

EXAMPLE 1

This example illustrates making a peanut butter composition in accordance with the present invention, and its application to a granola-type bar. The peanut butter composition was prepared by combining 75.3% (approximately 75%) peanut butter into a mixer with 0.2% lecithin, 15% sorbitol solution (70% sorbitol solution), 1.0% salt, and 4.5% "Stabilizer PS 105" obtained from Danisco. A temperature of approximately 85° F. was not exceeded throughout the entire process. The composition was then mixed to homogeneity. In the next step, 4% "N-Zorbit" food starch, obtained from National Starch, was added to the composition and mixed to homogeneity. The composition was then stored covered, at ambient temperature of approximately 70° F., for 24 hours such that it formed a cuttable gel, or dough type material. The cuttable gel was broken into pieces utilizing a "Comil" milling apparatus, wherein the pieces were preferably less than ¾ of an inch in any dimension. The gel pieces were processed in a standard streusel topping machine, and deposited onto granola-type bars. The bars with the applied peanut butter pieces were fed through compression rollers set at ambient temperature so as to spread the peanut butter topping over the bar. The bars were subsequently enrobed in chocolate. The finished product did not experience the expected oiling out problem even after a storage period of six, nine and twelve months.

The foregoing invention has been described in accordance with the relevant legal standards, thus the description is exemplary rather than limiting the nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A cuttable gelled nut butter composition consisting of 65-85% nut butter, 0.15-0.5% emulsifier, 5-30% sugar alcohol, 1-5% triglyceride-based stabilizer, 0 to 1% salt and 1-5% food starch; wherein said nut butter composition does not exhibit oil separation after nine months of storage.

2. A nut butter composition of claim 1, wherein the nut butter is selected from the group consisting of: almond butter, cashew butter, hazelnut butter, pecan butter, macadamia nut butter, walnut butter, peanut butter, sunflower seed butter, soy seed butter, and sesame seed butter.

3. A composition of claim 1, wherein the nut butter is peanut butter.

4. A composition of claim 3, wherein the emulsifier is lecithin.

5. A composition of claim 3, wherein the sugar alcohol is sorbitol.

6. A composition of claim 3, wherein the food starch is a dextrin.

7. A composition of claim 1, wherein the nut butter is peanut butter, the emulsifier is lecithin, the sugar alcohol is sorbitol, and the food starch is a dextrin.

8. A food product comprising the nut butter of claim 7, and chocolate.

9. A food product of claim 8, wherein the chocolate is a chocolate coating on a bar-shaped food.

10. A food product comprising the composition of claim 1, and additionally chocolate.

11. A method of preparing a gelled peanut butter composition consisting of the steps of: blending nut butter, emulsifier, sugar alcohol, optionally salt and triglyceride-based stabilizer so as to create a first blend; blending food starch with the first blend to create a second blend; resting the second blend until a gel is formed, wherein the nut butter is not more than 85° F. and 65-85%, the emulsifier is 0.15-0.5%, the sugar alcohol is 5-30%, the salt is 0 to 1%, the triglyceride-based stabilizer is 1-5%, and the food starch is 1-5%.

12. A method of claim 11, wherein the nut butter is selected from the group consisting essentially of: almond butter, cashew butter, hazelnut butter, pecan butter, macadamia nut butter, walnut butter, peanut butter, sunflower seed butter, soy seed butter, and sesame seed butter.

13. A method of claim 11, wherein the nut butter is peanut butter.

14. A method of claim 13, wherein the emulsifier is lecithin.

15. A method of claim 13, wherein the sugar alcohol is sorbitol.

16. A method of claim 13, wherein the food starch is a dextrin.

17. A method of claim 13, wherein the nut butter is peanut butter, the emulsifier is lecithin, the sugar alcohol is sorbitol, and the food starch is a dextrin.

18. A food product comprising
   a granola bar;
   a cuttable gelled nut butter composition consisting of 65-85% nut butter, 0.15-0.5% emulsifier, 5-30% sugar alcohol, 1-5% triglyceride-based stabilizer, 0 to 1% salt and 1-5% food starch, wherein said nut butter composition does not exhibit oil separation after nine months of storage;
   a chocolate coating; and
   wherein the nut butter composition is a first coating on the granola bar, and the chocolate coating is a second coating on the first coating.

19. A food product of claim 18, wherein the nut butter is peanut butter, the emulsifier is lecithin, the sugar alcohol is sorbitol, and the starch is a dextrin.

* * * * *

UNITED STATES PATENT AND TRADEMARK OFFICE
CERTIFICATE OF CORRECTION

| | |
|---|---|
| PATENT NO. | : 7,803,418 B2 |
| APPLICATION NO. | : 11/863948 |
| DATED | : September 28, 2010 |
| INVENTOR(S) | : Barbara L. Garter et al. |

It is certified that error appears in the above-identified patent and that said Letters Patent is hereby corrected as shown below:

Column 3, Line 21; "insulins" should read -- inulins --.

Column 4, Line 32; "base" should read -- based --.

Signed and Sealed this

Twenty-third Day of November, 2010

David J. Kappos
*Director of the United States Patent and Trademark Office*